J. A. STUBBLEFIELD.
LOCK NUT.
APPLICATION FILED APR. 30, 1917.
1,246,679.
Patented Nov. 13, 1917.
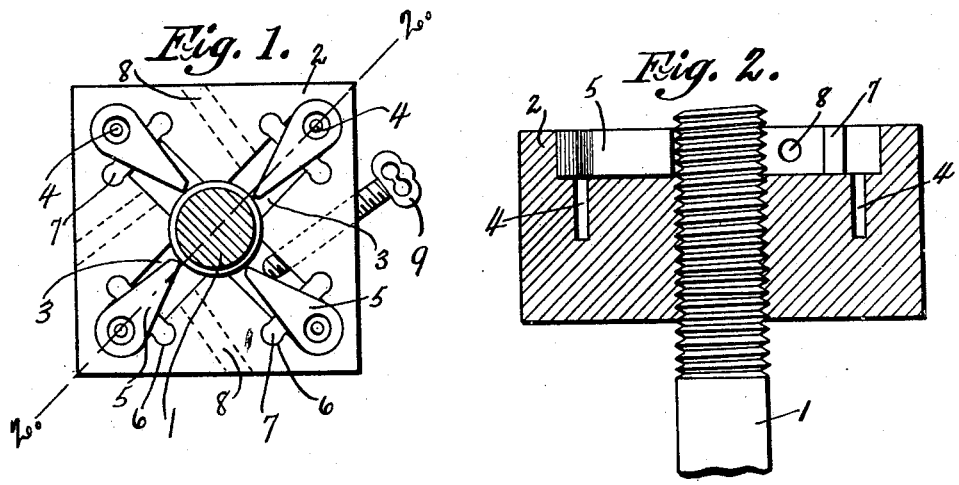
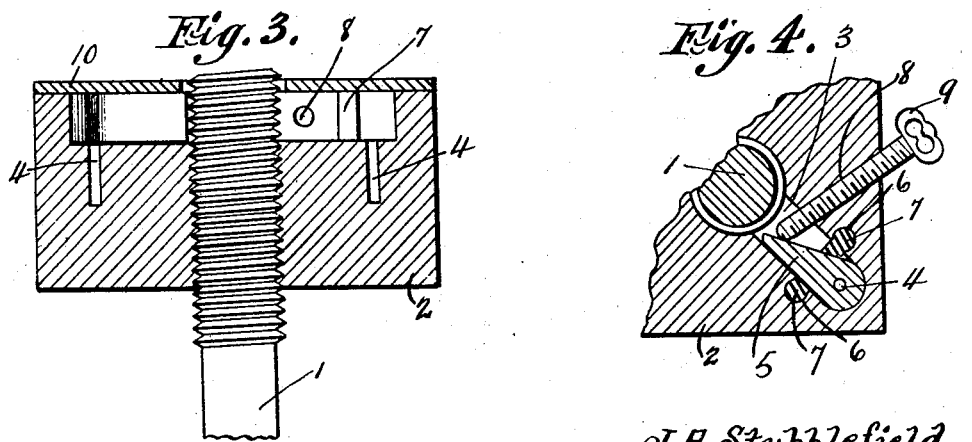
J. A. Stubblefield,
Inventor

UNITED STATES PATENT OFFICE.

JOHN A. STUBBLEFIELD, OF PORTLAND, OREGON, ASSIGNOR OF ONE-HALF TO J. W. BUTLER, OF PORTLAND, OREGON.

LOCK-NUT.

1,246,679.  Specification of Letters Patent.  Patented Nov. 13, 1917.

Application filed April 30, 1917. Serial No. 165,488.

*To all whom it may concern:*

Be it known that I, JOHN A. STUBBLEFIELD, a citizen of the United States, residing at Portland, in the county of Multnomah and State of Oregon, have invented a new and useful Lock-Nut, of which the following is a specification.

This invention relates to nut locks, and aims to provide in connection with a nut a simple and efficient positive locking and unlocking means which is unaffected by such atmospheric influences as have heretofore been apt to render such devices inoperative.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings:

Figure 1 is a top plan view of the device;

Fig. 2 is a section on the line 2—2 of Fig. 1;

Fig. 3 is a section showing the cover plate embodied in the invention;

Fig. 4 is a detail view of a portion of the operative parts.

Referring to the drawings, the numeral 1 indicates the shank of a bolt upon which is carried the nut 2. The nut 2 is provided with elongated opposed radial recesses 3 communicating with the bore and having pivoted therewithin as at 4, pawls 5 adapted for engagement with the threads of the bolt upon counter-clockwise rotation of the nut. In communication with said recesses 3 and in opposite walls thereof are cavities 6 for the reception of rubber abutments 7 adapted to normally hold the pawls 5 coincident with the longitudinal axes of the recesses 3.

Formed within the nut and communicating with the recesses 3 and tangential to the central bore of the nut are bores 8 screw-threaded to receive keys 9 designed to force the pawls from engagement with the threads of a nut when it is desired to unlock the same. A protecting cover 10 of thin sheet metal may be secured to the free face of the nut should it be so desired.

In operation the keys 9 are positively screwed until the biting terminals of the pawls are within the recesses 3. The nut is then placed upon a bolt or shaft and screwed to the position desired. The keys 9 are then negatively screwed to allow the pawls to bite into the threads of the bolt to insure a positive lock against further rotation.

Attention is particularly directed to the rubber abutments 7 which are unaffected by atmospheric conditions and will not become inapt for use in the manner of springs or other metallic centering devices.

Having thus described the invention, what is claimed as new is:

The combination with a bolt of a nut having recesses formed therein and extending radially from the bolt, pawls pivoted in the recesses, there being threaded bores in the nut disposed tangentially of the bolt and entering the recesses, keys adapted to the bores for holding the pawls in inoperative position, and resilient means for moving the pawls to operative position.

In testimony that I claim the foregoing as my own, I have hereto affixed my signature in the presence of two witnesses.

JOHN A. STUBBLEFIELD.

Witnesses:
A. J. CHRISTOPHERSON,
LOUISE C. WATSON.

Copies of this patent may be obtained for five cents each, by addressing the "Commissioner of Patents, Washington, D. C."